No. 627,823. Patented June 27, 1899.
F. W. KINNEY.
ELASTIC TIRE FOR VEHICLES.
(Application filed Jan. 16, 1899.)

(No Model.)

Witnesses:
Fred Gerlach
Alberta Adamick

Inventor:
Frank W. Kinney
By Pierce & Fisher
his Attorneys.

UNITED STATES PATENT OFFICE.

FRANK W. KINNEY, OF CHICAGO, ILLINOIS, ASSIGNOR TO THE CALUMET RUBBER TIRE COMPANY, OF SAME PLACE.

ELASTIC TIRE FOR VEHICLES.

SPECIFICATION forming part of Letters Patent No. 627,823, dated June 27, 1899.

Application filed January 16, 1899. Serial No. 702,249. (No model.)

*To all whom it may concern:*

Be it known that I, FRANK W. KINNEY, a resident of Chicago, in the county of Cook and State of Illinois, have invented certain new and useful Improvements in Elastic Tires for Vehicles, of which I do declare the following to be a full, clear, and exact description.

This invention has relation more particularly to the improvement of that class of rubber tires commonly known as "solid" tires, that are used upon the wheels of carriages or like vehicles. In the construction of this class of tires the body of the tire proper, which is composed of rubber, has usually embedded therein one or more wires that serve to hold the rubber of the tire under the longitudinal compression that is given to it before it is placed in position upon the wheel. Inasmuch as the wires resist the return of the compressed mass of rubber to its normal condition, there is a tendency of the tires under the movement of the rubber incident to the jars and strains of usage to chafe and wear through the body of the tire, and as a considerable part of the lateral strains suddenly or severely thrown upon the tire are transmitted to the wire bands there is a further danger of the wires working out of their normal position by wearing away the adjacent part of the rubber. It has been heretofore attempted to overcome this objection to the use of wires by substituting therefor a flat steel tape or band; but this has not given entire satisfaction, as the edges of the tape tend to chafe and wear in lateral direction through the rubber of the tire.

The object of the present invention is to provide the rubber tire with a retaining-ring that shall be more durable and effective than the wires or the flat steel tape heretofore used, the contour of the ring being such that all danger of its chafing or cutting the rubber or shifting its position therein will be avoided.

The invention consists in the novel construction of tire hereinafter described, illustrated in the accompaying drawings, and particularly pointed out in the claim at the end of this specification.

Figure 1:
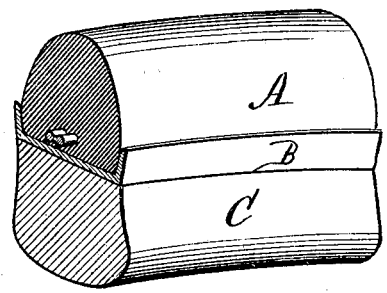
Figure 2:
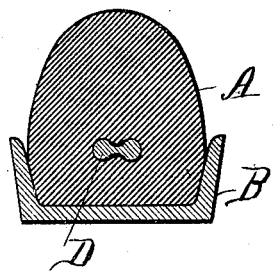
Figure 3:
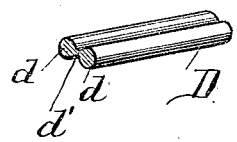

Figure 1 is a perspective view of a rubber tire embodying my invention, the tire being shown in position upon the felly of the wheel. Fig. 2 is a view in vertical cross-section through the tire and its retaining-ring. Fig. 3 is a detail perspective view of a portion of the metal ring.

The body A of the tire will be composed of rubber molded with a chamber that extends throughout its length, this chamber being closed except at its ends, where it is left open for the passage therethrough of the retaining-ring D. In practice the rubber body A will be so molded that the walls of its interior chamber will conform to the outline of the ring. The rubber body is seated within the metal rim B, of channel steel or iron, that will be fixed upon the rim or felly C of the wheel in the usual manner. The retaining-ring D, that is embedded in the rubber body A, is of the peculiar shape shown in the drawings—that is to say, this retaining-ring consists of a central web $d'$, having solid thickened edges $d$, these thickened edges extending both above and below said web, so as to form upon each side of the ring a channel to receive the compressed rubber of the body, and thus hold the ring against displacement. The ring D is preferably formed from steel, the desired contour being given thereto by suitable rolls or dies. In practice the body A of the tire is molded with a core adapted to form the closed chamber, corresponding substantially in outline to the contour of the ring D, which ring will be inserted into the body A after the core has been withdrawn. The rubber of the tire will then be compressed and the ends of the ring will be welded or brazed together, preferably by the electric welding process.

Inasmuch as the ring D is provided upon both sides with the channels intermediate its thickened edges, the compressed rubber of the tire is forced into these channels, and thus effectively serves to resist any tendency of the ring to chafe or wear, and thus shift its position within the mass of rubber. When a band or ring has its ends joined together, there is found to be more or less tendency to twist, particularly under the strains thrown upon such band after the body of the tire has been forced thereon and compressed; but by my improved ring, inasmuch as there are channels formed upon both its sides, all tendency of the ring to twist or shift is effectively guarded against.

Another marked advantage incident to my invention is that inasmuch as the thickened edge portions $d$ of the ring are solid the ends of the ring can be electrically welded with a butt-joint, the thickened edges being usually of the size of the wires heretofore employed in this class of tires. In practice it has been found to be the only practical way of joining the ends of a retaining-ring, and one of the vital objections to sheet-metal bands has been the impossibility of electrically welding their ends because by reason of its thinness the metal will burn before the welded joint can be successfully formed. Hence it will be seen that while my present invention affords all the supposed advantages of the double wires and of the band heretofore employed in this class of tires it at the same time overcomes all the objections incident to such wires and such band.

I am aware that it has been heretofore proposed to form a rubber tire with an interior band of sheet metal, the edges of the sheet metal being turned over upon one side of the band to form tubes at such points; but such device is incapable of accomplishing the purpose of my invention for the reasons above stated.

Having thus described my invention, what I claim as new, and desire to secure by Letters Patent, is—

A tire for vehicles comprising an annular channel B, an annular elastic body A compressed in the direction of its length and molded with a continuous closed chamber throughout its length, and a retaining-ring embedded within and filling said chamber and having its ends joined together, said ring consisting of a central web $d'$ having solid thickened edges $d$, said thickened edges extending both above and below the plane of said web and thus forming channels on both sides of the ring to receive the compressed rubber of the body, and hold the ring against lateral displacement.

FRANK W. KINNEY.

Witnesses:
GEO. P. FISHER, Jr.,
ALBERTA ADAMICK.